United States Patent [19]

Kato

[11] Patent Number: 5,103,669

[45] Date of Patent: Apr. 14, 1992

[54] INSTRUMENT FOR MEASURING UNIFORMITY OF TIRE

[75] Inventor: Mikio Kato, Kobe, Japan

[73] Assignee: Kabushiki Kaisha Kobe Seiko Sho, Kobe, Japan

[21] Appl. No.: 606,190

[22] Filed: Oct. 31, 1990

[30] Foreign Application Priority Data

Oct. 31, 1989 [JP] Japan .................. 1-128104[U]

[51] Int. Cl.$^5$ .................................. G01M 17/02
[52] U.S. Cl. .................................. 73/146; 384/476
[58] Field of Search .................. 73/146, 862.07; 384/476, 900

[56] References Cited

U.S. PATENT DOCUMENTS

| | | | |
|---|---|---|---|
| 4,541,738 | 9/1985 | Leibensperger et al. | 384/476 |
| 4,848,143 | 7/1989 | Ushikoshi | 73/146 |
| 4,852,398 | 8/1989 | Cargould et al. | 73/146 |
| 4,948,269 | 8/1990 | Hamilton | 384/476 |
| 4,971,128 | 11/1990 | Koga et al. | 73/146 |

Primary Examiner—Donald O. Woodiel
Attorney, Agent, or Firm—Oblon, Spivak, McClelland, Maier & Neustadt

[57] ABSTRACT

A tire uniformity measuring instrument which does not suffer from a temperature drift and assures accurate measurement of uniformity of a tire. The instrument includes a spindle to which a tire is removably mounted for coaxial integral rotation, a holder, a bearing for supporting the spindle for rotation around the spindle axis, and a driven drum supported for rotation around a fixed axis parallel to the axis of the spindle. The holder is movable in a direction perpendicular to the axis of the spindle until a tire connected to the spindle is contacted with the drum to allow the tire to be rotated by the drum when the drum is driven to rotate. A detector is held on the holder for measuring uniformity of a tire fixed to the spindle when the tire is rotated by the drum. The holder has a cooling water passage formed therein in the proximity of the bearing, and cooling water is circulated in the cooling water passage in the holder and cools the holder and the bearing.

7 Claims, 5 Drawing Sheets

INSTRUMENT FOR MEASURING UNIFORMITY OF TIRE

BACKGROUND OF THE INVENTION

1. Field of the Invention

This invention relates to an instrument for measuring uniformity of a tire.

2. Description of the Related Art

An instrument for measuring uniformity of a tire is conventionally known which includes a spindle to which a tire is to be connected concentrically, a holder for supporting the spindle by way of a bearing thereon, and a drum which is driven to rotate around an axis parallel to the spindle and wherein a detector for measuring uniformity of the tire which is pressed against and rotated by the drum is held on the holder.

Such a conventional instrument is disadvantageous in that, when a tire is to be rotated at a high speed to measure uniformity thereof, since the speed of rotation of the spindle is high, a temperature drift often takes place in the detector due to generation of heat at the bearing which supports the spindle thereon. The temperature has a bad influence on accuracy in measurement.

SUMMARY OF THE INVENTION

It is an object of the present invention to provide a tire uniformity measuring instrument which does not suffer from a temperature drift and assures accurate measurement of uniformity of a tire.

In order to attain the object, according to the present invention, there is provided an instrument for measuring uniformity of a tire, which comprises a spindle to which a tire is removably mounted for coaxial integral rotation, a holder, bearing means for supporting the spindle for rotation around the spindle axis, a drum supported for rotation around a fixed axis parallel to the axis of the spindle, means for driving the drum to rotate, means for moving the holder in a direction perpendicular to the axis of the spindle until a tire connected to the spindle is contacted with the drum to allow the tire to be rotated by the drum when the drum is driven to rotate, and a detector held on the holder for measuring uniformity of a tire fixed to the spindle when the tire is rotated by the drum, the holder having a cooling water passage formed therein in the proximity of the bearing means for circulating cooling water therealong.

With the tire uniformity measuring instrument, the bearing means which generates heat upon rotation of the spindle is cooled by cooling water which is circulated in the cooling water passage formed in the holder. Consequently, a possible temperature drift of the detector by heat generation of the bearing means is moderated or eliminated, and accordingly, a high degree of accuracy in measurement of uniformity of a tire is assured.

The above and other objects, features and advantages of the present invention will become apparent from the following description and the appended claims, taken in conjunction with the accompanying drawings.

DETAILED DESCRIPTION OF THE PREFERRED EMBODIMENT

Figure 4:
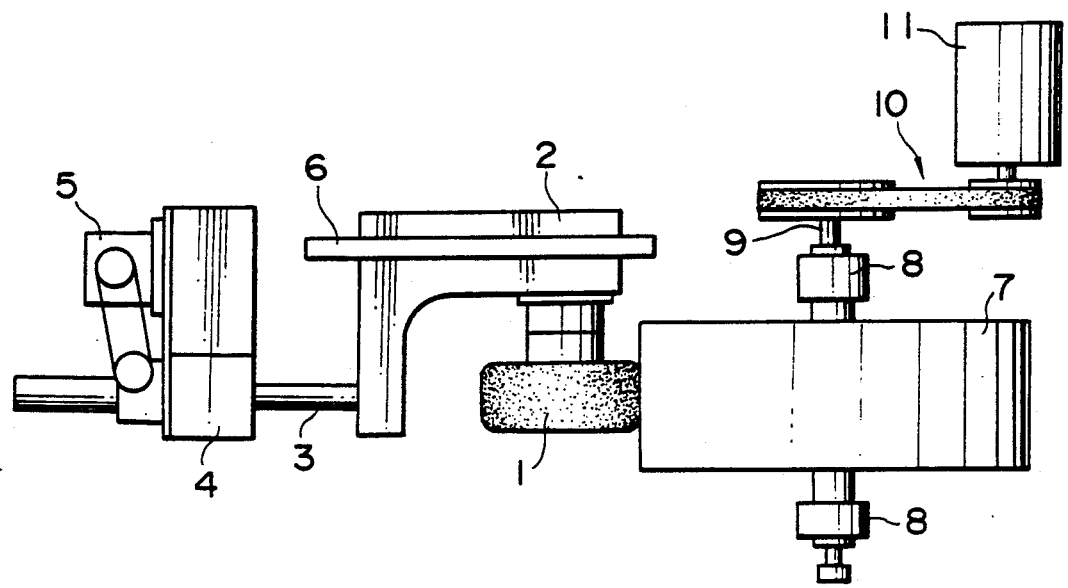
FIG. 4 is a plan view showing, in a further reduced scale, the entire measuring instrument of FIG. 1.
Figure 5:
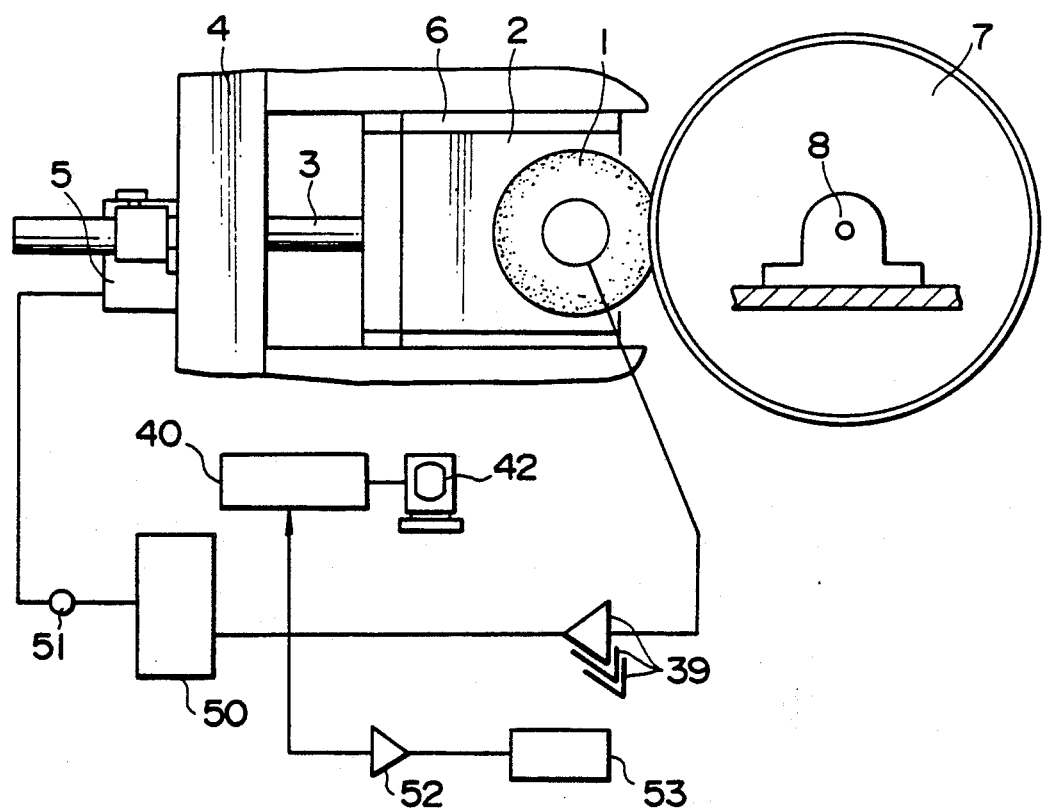
FIG. 5 is a side elevational view of the measuring instrument shown in FIG. 4.

Referring first to FIGS. 4 and 5, there is shown an entire apparatus for measuring uniformity of a tire to which the present invention is applied. The measuring apparatus includes a carriage 2 for moving a tire 1 in its diametrical direction (leftward and rightward directions in FIGS. 4 and 5). The tire 1 is removably mounted on the carriage 2 for rotation around the center of a rotary shaft of the carriage 2, and a screw shaft 3 is connected to an end of the carriage 2. The screw shaft 3 is supported on a stationary case 4 by way of a screw nut not shown such that an axial direction thereof coincides with a direction of movement of the tire 1. As the screw nut is driven to rotate by an AC servomotor 5, the screw shaft 3 is moved in an axial direction so that the tire 1 mounted on the carriage 2 is moved in its diametrical direction. It is to be noted that a guide 6 for guiding the carriage 2 in its moving direction is mounted on a stationary member such as a frame (not shown).

The measuring apparatus further includes a drum 7. The drum 7 is supported for rotation on the stationary member by way of a support member 8, and an axis of rotation thereof extends in parallel to the axis of rotation of the tire 1. Rotating power is transmitted from an AC motor 11 to a rotary shaft 9 of the drum 7 by way of a belt-and-pully transmission mechanism 10. Consequently, if the tire 1 is pressed against the drum 7, the tire 1 is rotated by the drum 7.

Figure 1:
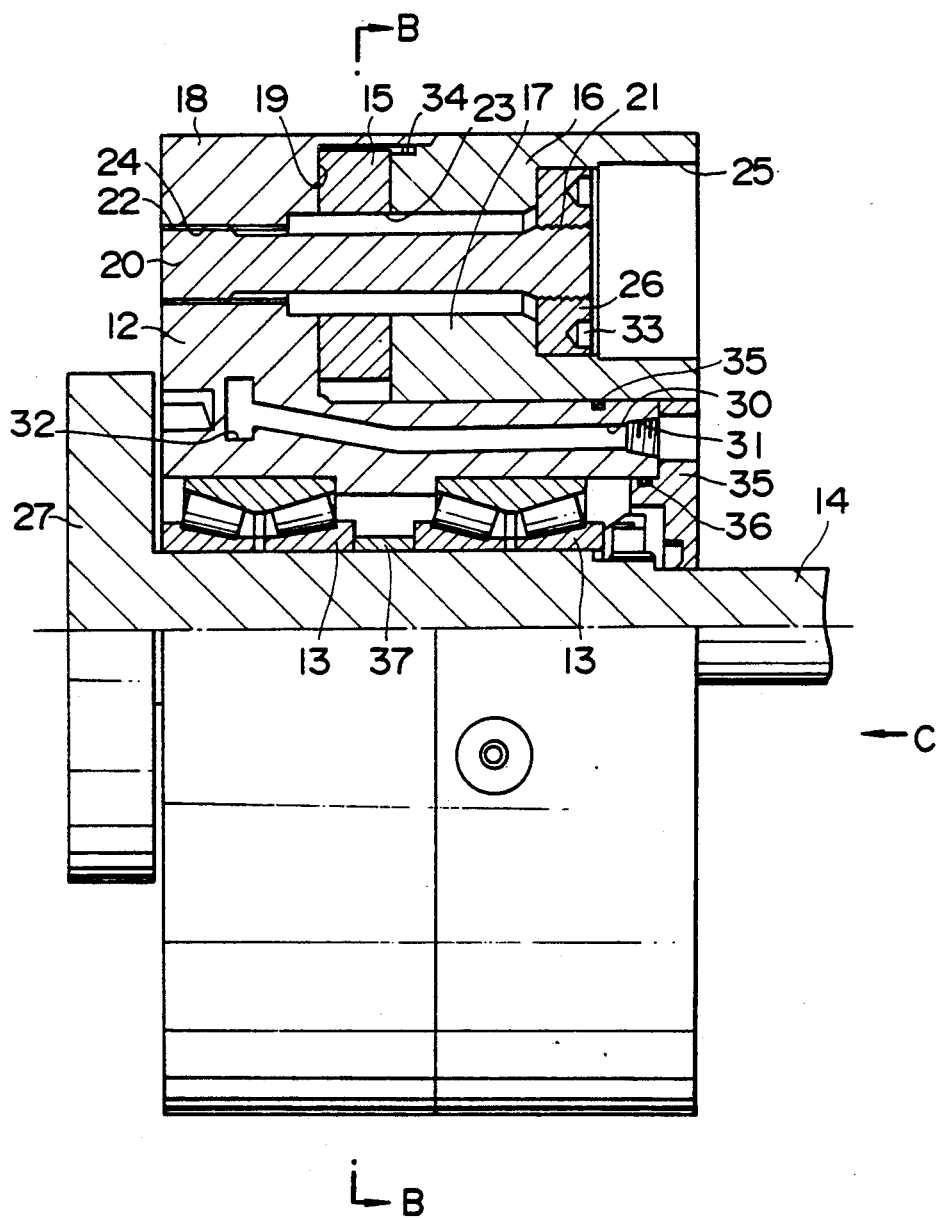
FIG. 1 is a side elevational sectional view of part of an instrument for measuring uniformity of a tire showing a preferred embodiment of the present invention, an upper half of FIG. 1 showing a section taken along line A—A of FIG. 2 while a lower half shows a side elevation.
Figure 2:
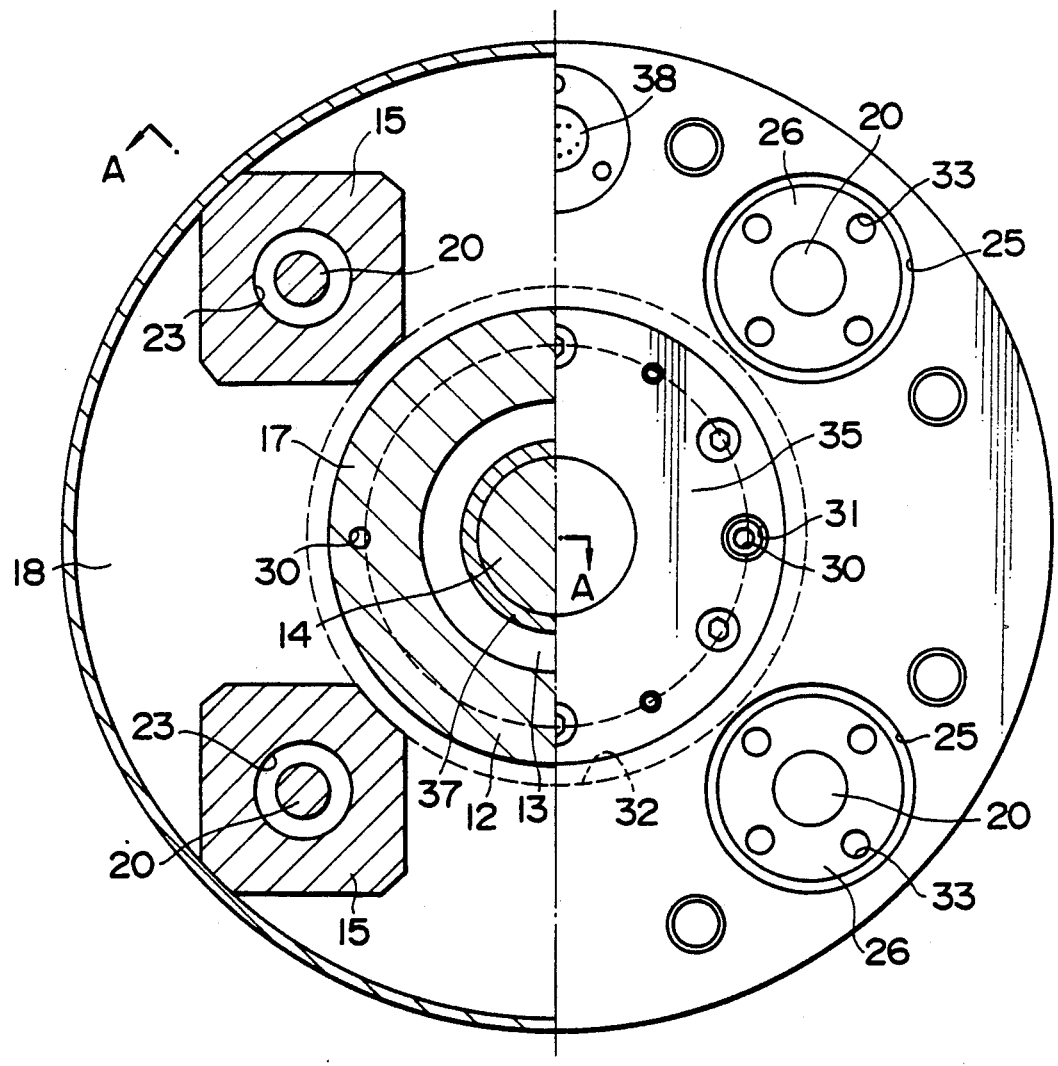
FIG. 2 is a front elevational sectional view wherein a left-hand side half shows a section taken along line B—B of FIG. 1 and a right-hand side half is a view as viewed in the direction indicated by an arrow mark C in FIG. 1.
Figure 3:
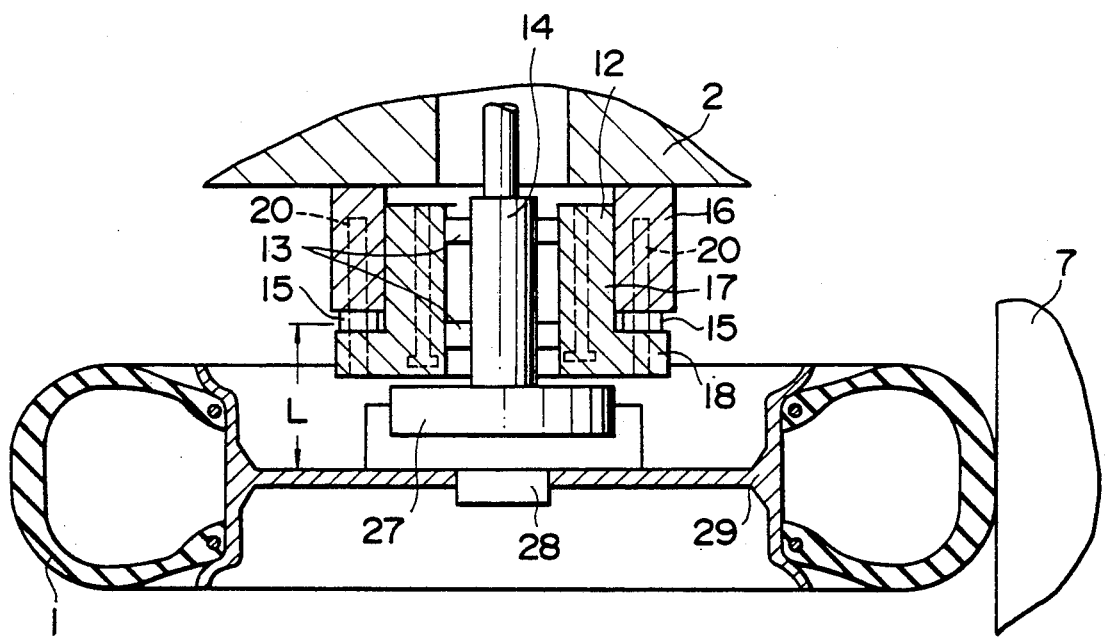
FIG. 3 is a horizontal sectional view showing, in a reduced scale, a general construction of part of the measuring instrument of FIG. 1.

Referring now to FIGS. 1 to 3, the tire 1 is mounted on the carriage 2 by way of a holder 12, a bearing 13, a spindle 14, detectors 15 and so forth. The tire 1 is incorporated in the rim 29 which is attached to a flange portion 27 of the spindle 14 by means of bolts through an adapter 28.

In particular, the holder 12 is disposed coaxially with the tire 1 and is principally formed from an outer tube member 16 and an inner tube member 17 fitted in the outer tube member 16. The outer tube member 16 is mounted at an end thereof on an end face of the carriage 2 remote from the tire 1 by way of suitable mounting means. Meanwhile, a flange 18 is formed on the inner tube member 17 in an opposing relationship to the other end of the outer tube member 16. An annular recess 19 is defined between the flange 18 of the inner tube member 17 and the opposing end face of the outer tube member 16 remote from the carriage 2, and the detectors 15 are fitted in the annular recess 19. A seal 34 is interposed between the outer tube member 16 and the inner tube member 17. Further, an annular cap 35 is mounted at an end (right end in FIG. 1) of the inner tube member 17, and another seal 36 is interposed between the annular cap 35 and the inner tube member 17.

The detectors 15 are held between the outer tube member 16 and the flange 18, and a tie rod 20 extends through each of the detectors 15. Each of such tie rods 20 has a pair of male thread portions 21 and 22 formed at the opposite ends thereof and extends through a center bore 23 of a corresponding detector 15, and the male thread portion 21 at one end thereof is positioned in a corresponding one of recesses 25 formed at an end of the outer tube member 16 while the male thread portion 22 on the other end is screwed in a female thread 24 formed in the flange 18. A nut 26 is received in each of the recesses 25 and screwed on the male thread portion 21 of the corresponding tie rod 21. Each of the nuts 26 has four recesses 33 formed on an end face thereof for engaging with a tool to operate the nut 26. It is to be noted that, in the present embodiment, each of the detectors 15 is a load cell, and a preload is applied to each of the detectors 15 by tightening the nut 26 for the detector 25.

The spindle 14 is supported on an inner periphery of the inner tube member 17 by way of a pair of bearings 13 disposed in a spaced relationship in the axial direction. Here, each of the bearings 13 is a double row tapered roller bearing. A cylindrical spacer 37 is fitted around the spindle 14 between the bearings 13 in the axial direction.

A pair of passages 30 for cooling water are formed in the inner tube member 17 in the proximity of the bearings 13. The passages 30 extend in the axial direction and are disposed at diametrically symmetrical positions with respect to the spindle 14. Each of the passages 30 is opened at an end thereof to an end (right end in FIG. 1) of the holder 12, and a female thread 31 is formed in each of the passages 30 adjacent the opening. Though not shown, a pipe is removably screwed in the female thread 31 of each of the passages 30 to connect the passage 30 to a cooling water supply source not shown. The other end of each of the passages 30 is communicated with the other passage 30 by way of an annular chamber 32 formed in the holder 32. Thus, cooling water from the cooling water supply source is admitted into one of the passages 30 (the left-hand side one of the openings in FIG. 2) by way of the opening, passes through the one passage 30 and the annular chamber 32 and then through the other passage 30 and flows out from the opening of the other passage 30. While cooling water circulates in this manner, it cools the holder 12 and the bearings 13 in the holder 12.

Referring back to FIG. 5, the AC servomotor 5 is controlled by a sequencer 50 by way of a driver 51. A plurality of charge amplifiers 39 are connected to the sequencer 50, and the detectors 15 are individually connected to the charge amplifier 39. The charge amplifiers 39 are also connected to an operating unit 40 which is in turn connected to a display unit 42. The charge amplifiers 39 are further connected individually to buffer amplifiers 52 which are connected to a digital display unit 53.

Referring to FIGS. 1 to 5, when uniformity of a tire 1 is to be measured by the measuring instrument, first the tire 1 is moved in a diametrical direction, that is, in a direction perpendicular to the axis of rotation of the tire 1 and hence of the spindle 14 by the carriage 2 until it is pressed against the drum 7 as seen in FIG. 1, and then the drum 7 is driven to rotate by the AC motor 11. Consequently, the tire 1 is rotated by the drum 7. Upon such rotation of the tire 1, also the spindle 14 supported on the holder 12 by way of the bearings 13 is rotated by the tire 1. Accordingly, if the tire 1 has some non-uniformity in thickness of rubber, for example, at a tread portion thereof, then such non-uniformity is measured as a variation in load by the detectors 15.

Figure 6:
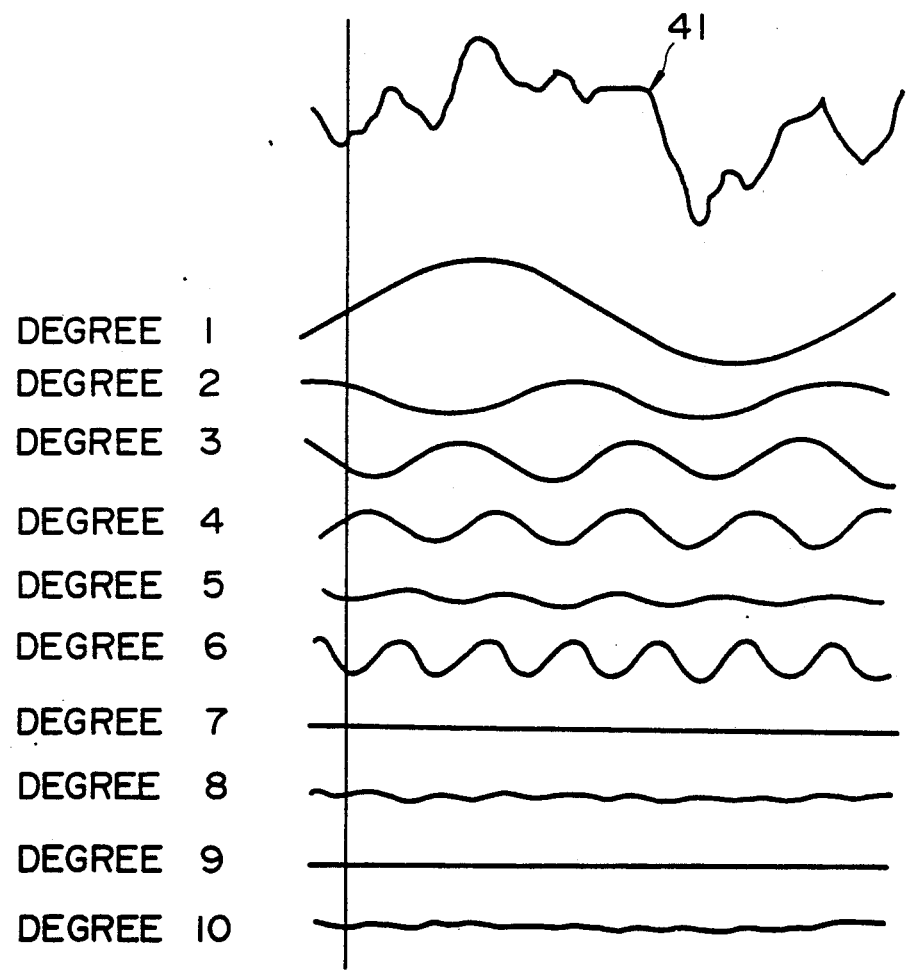
FIG. 6 is a graph showing exemplary waveforms obtained by the measuring instrument.

In the present embodiment, the detectors 15 detect thickness variation components in three directions (an axial direction of the tire 1, a moving direction of the tire 1 by the carriage 2 and a direction perpendicular to the two directions), and results of such detection are transmitted to the operating unit 40 individually by way of the charge amplifiers 39 and analyzed by the operating unit 40, and then displayed on the display unit 42. A waveform 41 of FIG. 6 wherein the axis of ordinate represents a magnitude of a variation and the axis of abscissa represents time shows an exemplary one of such variation components. Various waveforms shown below the waveform 41 in FIG. 6 indicate results of higher order analyses depending upon harmonic analysis of such variation components and are waveforms of the first through tenth harmonics of the waveform 41.

With the measuring instrument described above, if the supporting rigidity of the spindle 14 is low, then the measurement accuracy is low, and accordingly, if the dimension (L) shown in FIG. 3 is decreased as small as possible in order to position the detectors 15 as near as possible to the tire 1, then the influence of the supporting rigidity is decreased. Further, while a single row tapered roller bearing is normally employed for such bearings 13, a double row tapered roller bearing is employed for the bearings 13 in the present embodiment in order to raise the supporting rigidity. Consequently, more accurate measurement is assured with the measuring instrument of the present embodiment.

It is to be noted that the natural frequency of the measuring system can be raised by such improvement in supporting rigidity of the spindle 14 and the arrangement of the detectors 15 in the proximity of the tire 1. Consequently, when a harmonic analysis is to be made, a maximum rotational speed $n_{max}$ (rpm) of the tire 1 is increased to make an analysis in high harmonic degree accurate because, where a harmonic degree is represented by H, a tire rotational speed corresponding to a harmonic degree is represented by n (rpm), and a natural frequency of the measuring system is represented by $\zeta$(Hz), the maximum rotational speed $n_{max}$ (rpm) is represented by $$H \cdot n = \frac{\zeta}{4} \times 60 = n_{max}$$

Then, the influence of heat generation at the bearings 13 upon accuracy in measurement of the detectors 15 is cancelled by cooling water flowing in the passages 30, and no or little temperature drift will take place in the detectors 15. Particularly in the present embodiment, since a preload is applied to the detectors 15 by means of the tie rods 20 extending in the axial direction of the tire 1, thermal deformation of the tie rods 20 in the axial direction can be prevented, and consequently, a possible temperature drift upon detection of uniformity of the tire 1 in the axial direction can be prevented effectively.

It is to be noted that the present invention is not limited to the embodiment described above, and for example, the detectors 15 may each be a strain gage, or the number or shape of the passages 30 for cooling water may be modified.

Having now fully described the invention, it will be apparent to one of ordinary skill in the art that may changes and modifications can be made thereto without departing from the spirit and scope of the invention as set forth herein.

What is claimed is:

1. An instrument for measuring uniformity of a tire, comprising:
   a spindle to which a tire is removably mounted for coaxial integral rotation,
   a holder,
   bearing means on said holder for supporting said spindle for rotation around an axis thereof,
   a drum supported for rotation around a fixed axis parallel to the axis of said spindle,
   means for driving said drum to rotate,
   means for moving said holder in a direction perpendicular to the axis of said spindle until a tire mounted on said spindle is contacted with said drum to allow the tire to be rotated by said drum when said drum is driven to rotate, and
   a detector held on said holder for measuring uniformity of a tire fixed to said spindle when the tire is rotated by said drum,
   wherein said holder has a cooling water passage formed therein and extending in proximity to said bearing means for circulating cooling water therealong.

2. An instrument according to claim 1, wherein said cooling water passage includes a pair of axial portions extending from an end face of said holder substantially in an axial direction of the spindle, and an annular portion interconnecting ends of said axial portions remote from said end face of said holder.

3. An instrument according to claim 2, wherein said annular portion of said cooling water passage extends around said bearing means.

4. An instrument according to claim 1, wherein said bearing means includes a double row tapered roller bearing.

5. An instrument according to claim 1, wherein said holder includes an outer tube member secured to said moving means, an inner tube member fitted for axial movement in said outer tube member and having a flange formed at an end thereof remote from said moving means, and a threaded rod member adjustably screwed at opposite ends thereof in said outer and inner tube members, and wherein said detector is a load cell held between said flange of said inner tube member and an opposing end face of said outer tube member such that a preload is applied to said load cell by means of said threaded rod member.

6. An instrument according to claim 1, wherein said bearing means comprises a double row tapered roller bearing.

7. An instrument according to claim 1, wherein said detector is held on said holder at a portion of said holder closest to the tire, whereby an effect of spindle rigidity is low.

* * * * *